(12) United States Patent
Opedal (10) Patent No.: US 7,033,631 B1
(45) Date of Patent: Apr. 25, 2006

(54) APPARATUS AND METHOD FOR DECLUSTERING CHERRIES

(76) Inventor: Leif Gunnar Opedal, Postboks 49, Lofthus (NO), N-5787

( * ) Notice: Subject to any disclaimer, the term of this patent is extended or adjusted under 35 U.S.C. 154(b) by 549 days.

(21) Appl. No.: 10/110,125

(22) PCT Filed: Oct. 3, 2000

(86) PCT No.: PCT/NO00/00324

§ 371 (c)(1),
(2), (4) Date: Apr. 18, 2002

(87) PCT Pub. No.: WO01/26491

PCT Pub. Date: Apr. 19, 2001

Related U.S. Application Data (60) Provisional application No. 60/159,098, filed on Oct. 13, 1999.

(51) Int. Cl.
*A23N 15/02* (2006.01)

(52) U.S. Cl. .............. 426/484; 99/638; 99/642; 99/643

(58) Field of Classification Search ............ 426/484; 99/638, 642, 643
See application file for complete search history.

(56) References Cited

U.S. PATENT DOCUMENTS

| | | | | |
|---|---|---|---|---|
| 2,714,411 A | * | 8/1955 | Aguilar et al. | 426/484 |
| 3,454,067 A | * | 7/1969 | Smeltzer et al. | 99/635 |
| 3,451,573 A | | 12/1974 | Hesse | |
| 4,152,977 A | | 5/1979 | Lazzarini | |
| 4,916,205 A | | 4/1990 | Morris et al. | |
| 5,050,492 A | * | 9/1991 | Wotton et al. | 99/638 |
| 6,298,645 B1 | * | 10/2001 | Hai | 60/781 |

FOREIGN PATENT DOCUMENTS

| | | | |
|---|---|---|---|
| AU | 61378/91 | | 2/1992 |
| CH | 654177 | * | 2/1986 |
| FR | 9306495 | * | 12/1994 |

* cited by examiner

*Primary Examiner*—Anthony Weier
(74) *Attorney, Agent, or Firm*—Christian D. Abel

(57) ABSTRACT

An apparatus and method for declustering cherries, including a plurality of oscillating cutting modules (36), each having a power driven shaft (40) with a plurality of circular blades (42) fixed along its length. The modules further comprise cutting ramps (46) having a tail section (48) extending under the blades, such that the clusters are suspended from their nodes at the moment of cutting. The height of tail sections (48) may be adjusted to accommodate cherry varieties having different stem lengths.

10 Claims, 12 Drawing Sheets

APPARATUS AND METHOD FOR DECLUSTERING CHERRIES

This application claims the benefit of Provisional application Ser. No. 60/159,098, filed Oct. 13, 1999.

TECHNICAL FIELD

This invention relates to fruit processing equipment and more particularly to a machine and method for declustering cherries.

BACKGROUND ART

Cherries intended for fresh consumption are generally packaged with their stems intact. After being picked, cherries are often in clusters of two or more cherries joined at the stem. In order to be processed by various automatic size-sorting machines, the cherries must be separated into individual cherries with a single stem. To ensure the most attractive packaged product, it is important that the stems of the cherries be cut as closely as possible to the point of intersection between the stems. Imprecise cutting results in one cherry from a cluster having a very short stem, leaving its mate with an unattractive double, "inverted-V" stem. This problem is exacerbated by the fact that different varieties of cherries have different stem lengths.

Previous devices, such as the device from U.S. Pat. No. 5,050,492, utilize a transport belt to move the clusters toward the cutting blades. Theses belts often travel at high speeds, which results in significant impact bruising of the fruit. The device from U.S. Pat. No. 5,050,492 will impart additional damage to the fruit by lifting the cherry clusters and pressing them against anvils at the moment of cutting.

Furthermore, no known device provides for the ability to be adjusted according to the stem length of the cherry variety being processed.

It is therefore the intention of the present invention to provide a machine and method for automatically declustering cherries by cutting the stems of joined cherries at their point of intersection, thus resulting in a high percentage of cherries with uniform stem length. The device according to the invention is also intended to provide gentle handling of the fruit and be adjustable to accommodate different cherry varieties.

DISCLOSURE OF THE INVENTION

An apparatus for declustering cherries, comprising a plurality of cutting modules, each module comprising a power driven shaft with a plurality of circular blades fixed along its length, said shaft being mounted lengthwise to an elongated, rectangular base plate. Each shaft is held by bearing housings above the surface of its corresponding base plate such that the circular blades may rotate with approximately 4 cm clearance between the bottom of the blade and the surface of the base plate. Attached to the surface of the base plate, immediately forward of each blade, is a cutting ramp having a generally triangular cross section, corresponding generally to the "inverted-V" formed by the stems of a pair of joined cherries. The leading end of each ramp begins as a point at the surface of the base plate forward of the blade, with the triangular cross section gradually increasing as the ridge of the ramp slopes up toward the blade. The trailing end of each ramp has an extended tail section projecting immediately underneath the blade and containing a groove into which the bottom of the circular blade is recessed. The shaft and ramps are mounted near the trailing edge of the base plate such that the ends of the tail sections extend past the trailing edge of the base plate. Vertical guide walls are positioned between adjacent cutting ramps forming a plurality of channels leading to the ramps.

The modules are mounted perpendicularly across a generally rectangular shaker frame, with the trailing edge of the first base plate adjacent to the leading edge of the next base plate and so on, thus forming a continuous transport surface. When so assembled, the tail sections from one module will extend over and above the leading edge of the adjacent base plate. The vertical distance between the tail sections of one module and the surface of the adjacent base plate is slightly greater than the length of a cherry stem.

Said shaker frame has rollers affixed thereto, which rest upon a generally rectangular support frame. Said support frame is pivotally mounted by trunnions to a base. Means are provided for adjusting the attitude of the support frame so that its trailing end may be positioned lower than its leading end. Cherries introduced into the leading end of said transport surface will thus fall downward toward the trailing end, passing from one cutting module to the next. Drive means cause the shaker frame to oscillate back and forth on its rollers in relation to the support frame, which further assists the cherries to proceed downstream from the leading end of the transport surface to the lower, trailing end.

As a cluster of joined cherries enters a channel formed by two guide walls, it proceeds downward until it encounters the cutting ramp. Due to the predetermined spacing between the guide walls and the ramp, one cherry of the cluster is temporarily caught between the inside surface of a guide wall and the side of the ramp. The other cherry (or cherries) of the cluster will seek the path of least resistance and be forced to the opposite side of the ramp. The oscillation of the shaker frame imparts a rotation to the cherries, which, together with the force from following clusters, causes the "inverted-V" of the stems to ride up the ridge of the ramp toward the blade. Because the distance between the tail section and the adjacent base plate is greater than the length of the stem, the cherry cluster will dangle from the tail section and be cut by the blade at the point of intersection of the stems. In order to accommodate varieties of cherries having different stem lengths, means are provided for adjusting the attitude of the modules such that the trailing edge of the base plates may be raised in relation to the leading edge of the next succeeding base plate. By adjusting the attitude of the modules, the height of the tail sections above the next base plate may be selectively increased or decreased. Cherries with single stems pass freely through the space between the guide walls and the ramps and exit the transport surface at the lower, downstream end.

BRIEF DESCRIPTION OF THE DRAWINGS

Details of the invention are described in connection with the accompanying figures, wherein.

DESCRIPTION OF THE PREFERRED EMBODIMENT OF THE INVENTION

Figure 1:
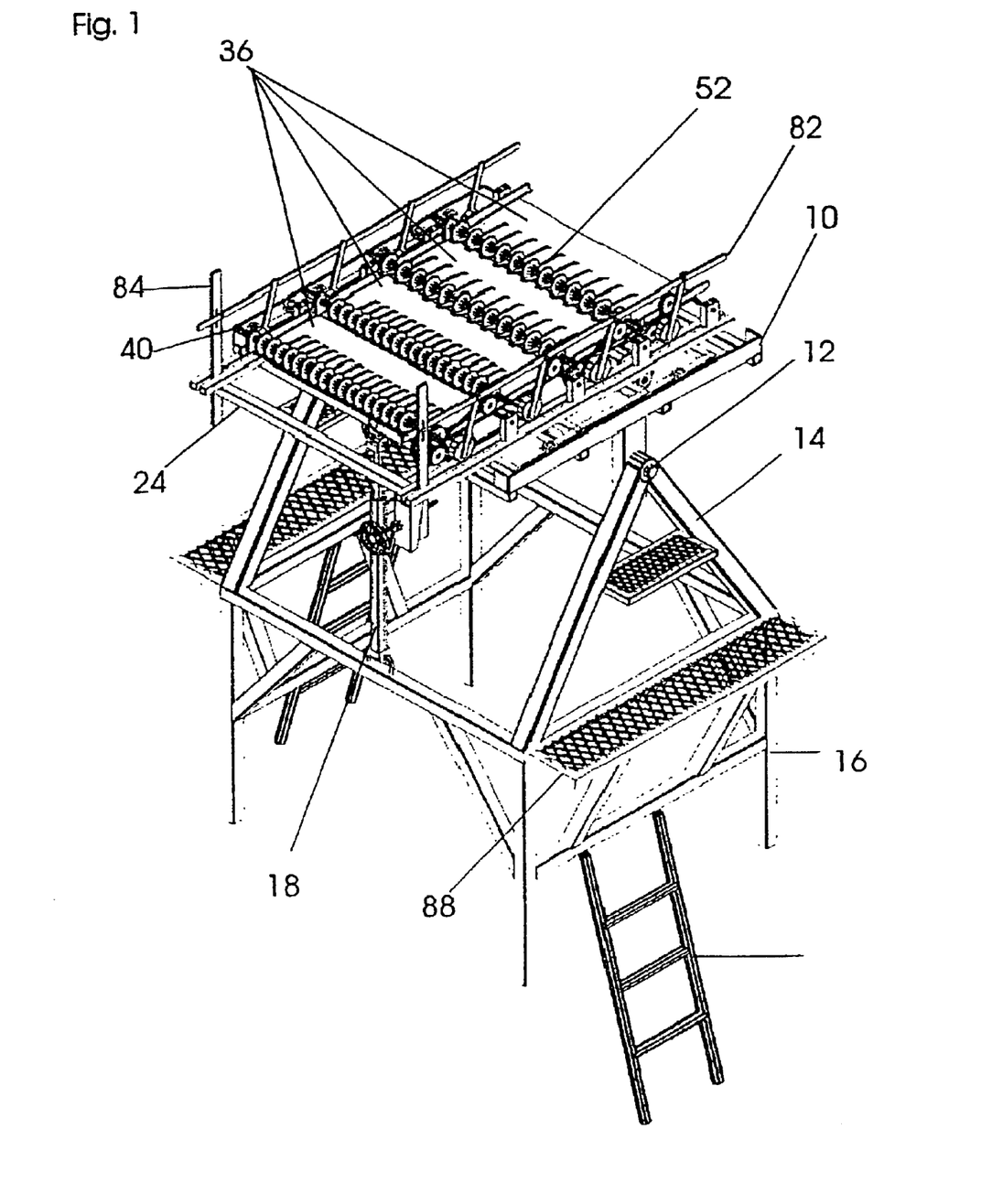
FIG. 1 is a perspective view of the apparatus
Figure 2:
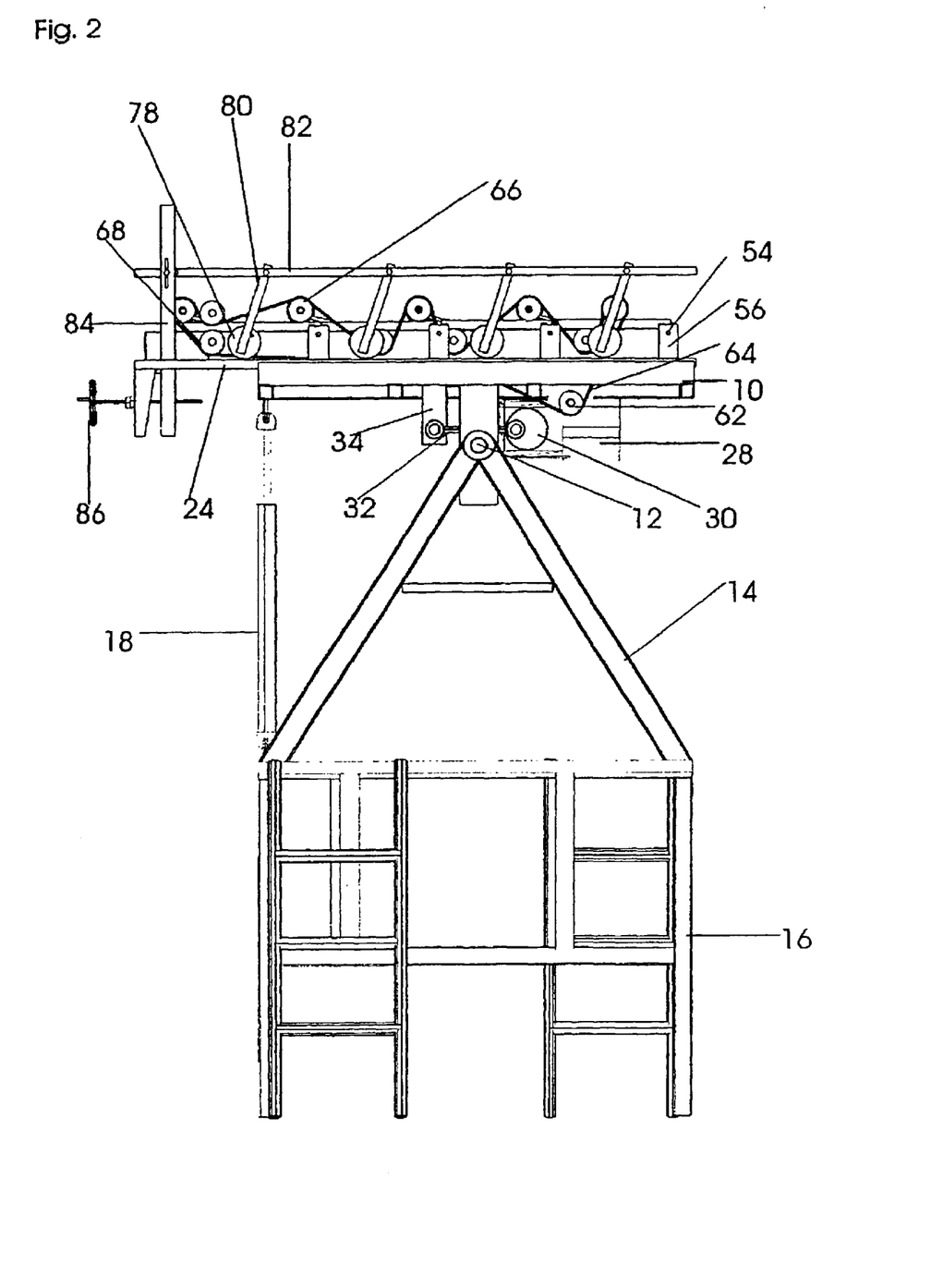
FIG. 2 is a side elevational view of the apparatus
Figure 4:
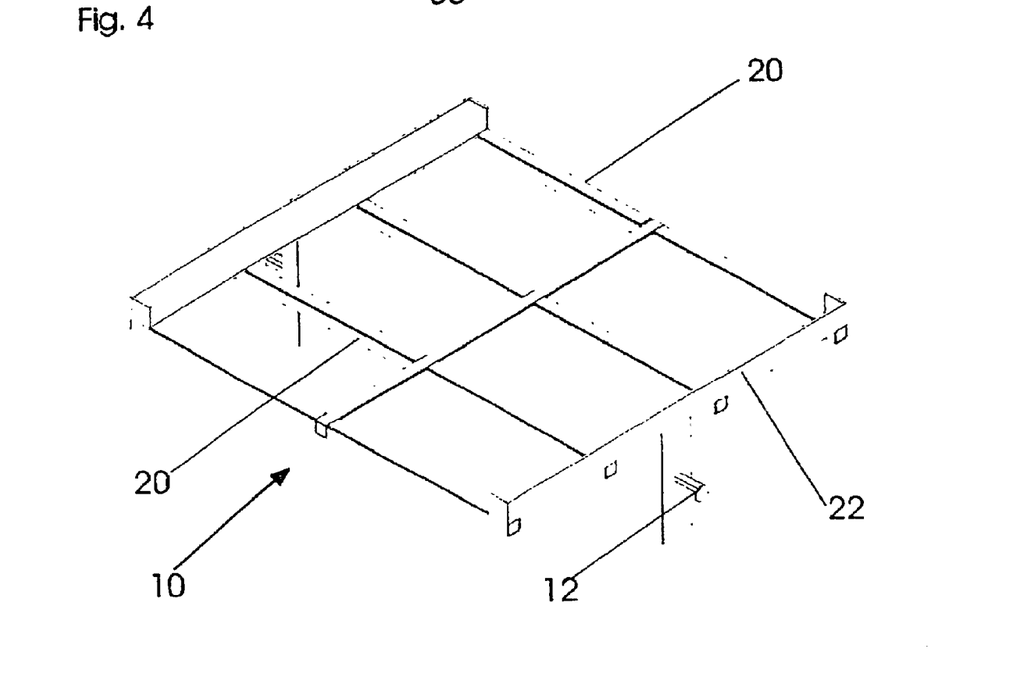
FIG. 4 is a perspective view of the rectangular support frame

Referring to FIGS. 1, 2 and 4 there is shown an apparatus for declustering cherries comprising a generally rectangular support frame 10 pivotally mounted by trunnions 12 to four diagonal frame members 14, said diagonal frame members being mounted on top of a base 16. A hydraulic cylinder 18 is connected between base 16 and one end, hereafter called the "trailing end", of support frame 10. Extending or retracting hydraulic cylinder 18 will thus adjust the attitude of support frame 10, for reasons to be explained later. As shown in FIG. 4, support frame 10 comprises a plurality of cross members 20 mounted perpendicularly between two side rails 22.

Figure 3:
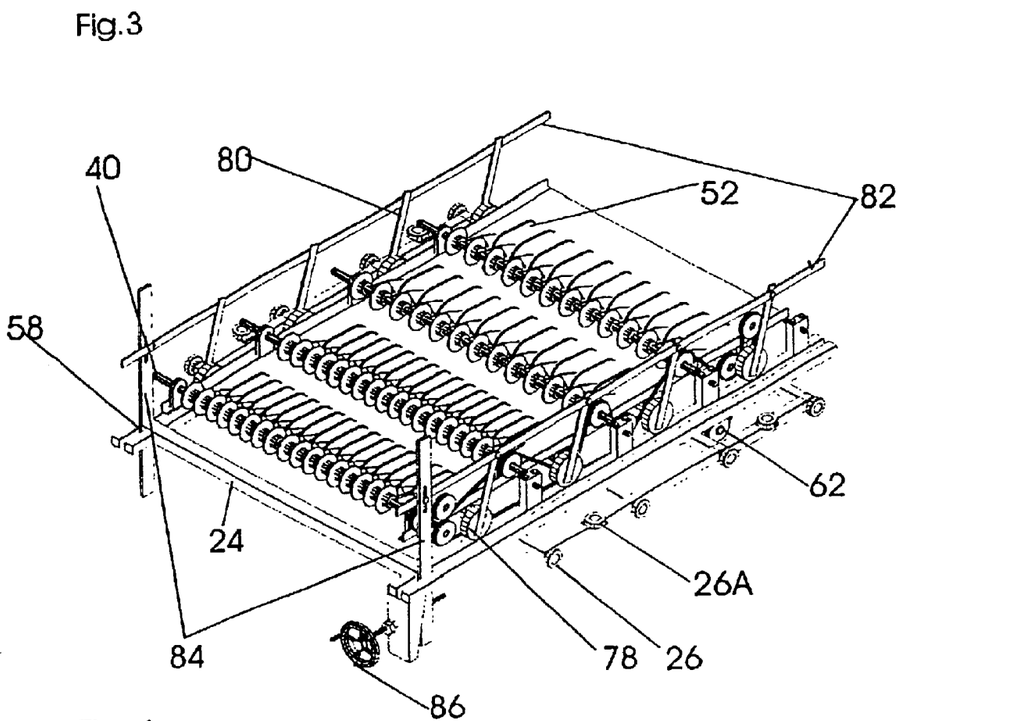
FIG. 3 is a perspective view of the shaker frame with cutting modules mounted thereto
Figure 5:
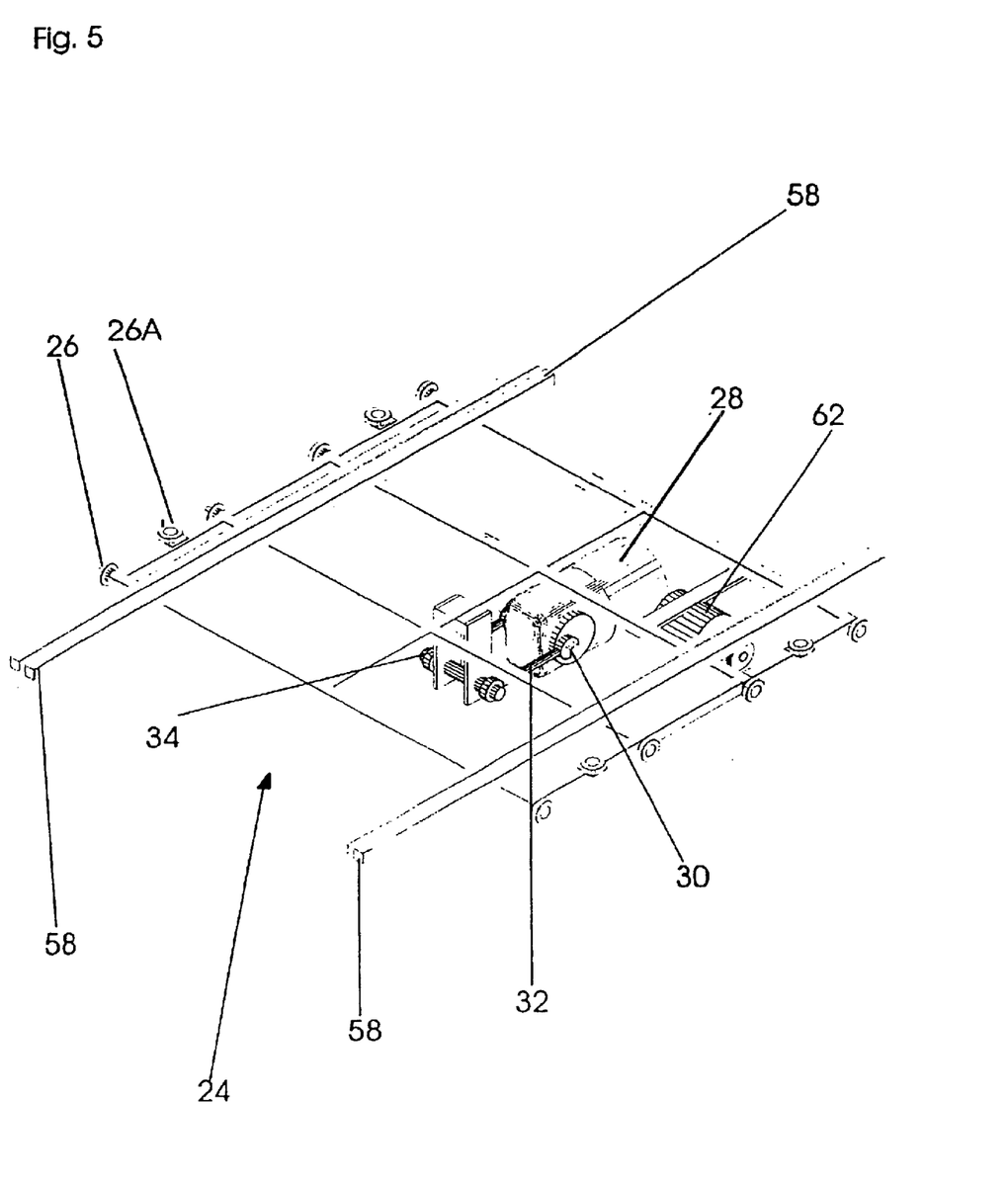
FIG. 5 is a perspective view of the shaker frame
Figure 6:
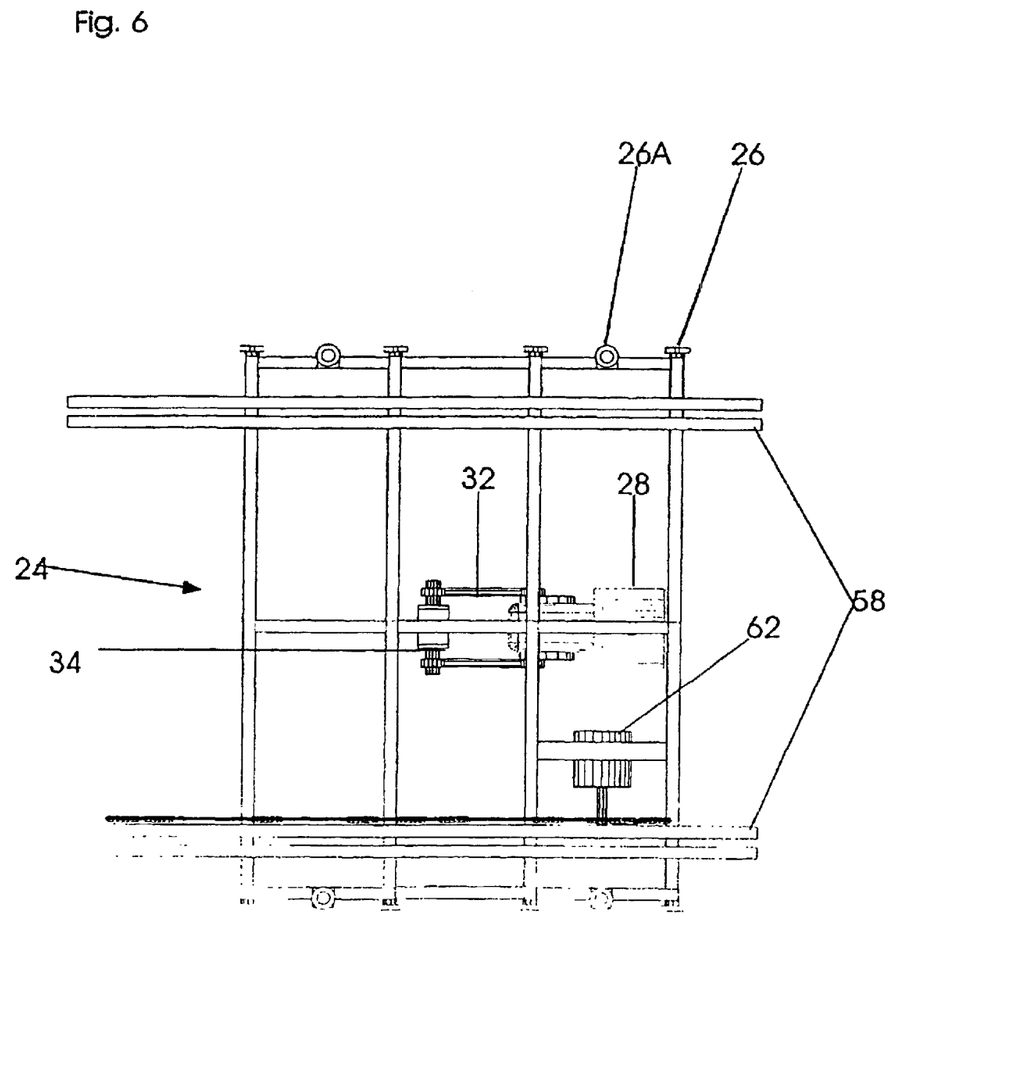
FIG. 6 is a top view of the shaker frame showing the oscillation motor and drive motor

As shown in FIGS. 3, 5 and 6, the invention further comprises a generally rectangular shaker frame 24 having a plurality of rollers 26 and 26A attached to the sides thereto. Shaker frame 24 rests upon support frame 10, with said rollers resting on side rails 22, thus permitting shaker frame 24 to move back and forth in relation to support frame 10. An electric oscillation motor 28 having an eccentric 30 is mounted to support frame 10 and connected by connecting rods 32 to a flange 34 attached to the underside of shaker frame 24. When motor 28 is engaged, eccentric 30 will cause shaker frame 24 to oscillate back and forth in relation to support frame 10.

Figure 7:
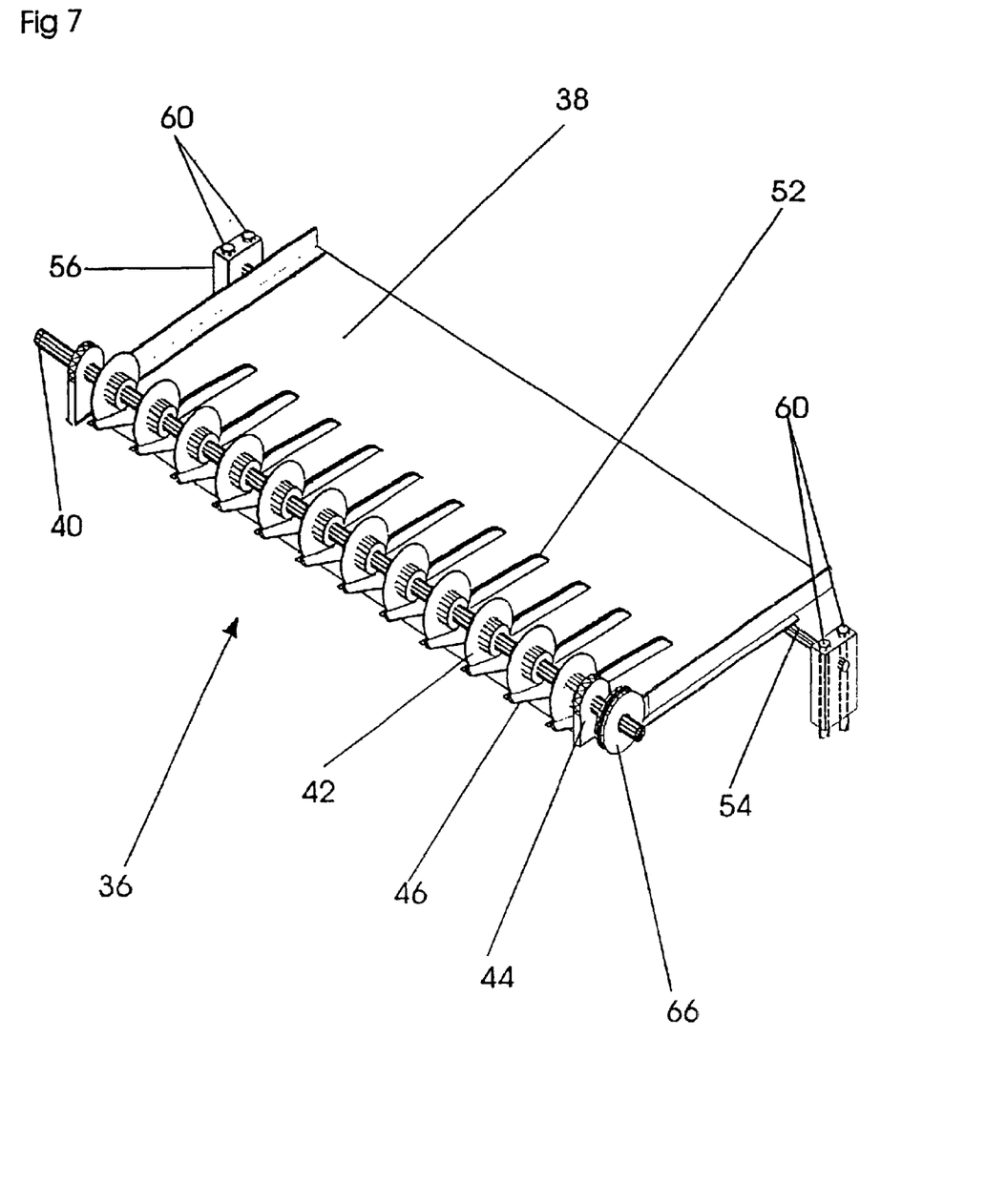
FIG. 7 is a perspective view of a cutting module
Figure 8:
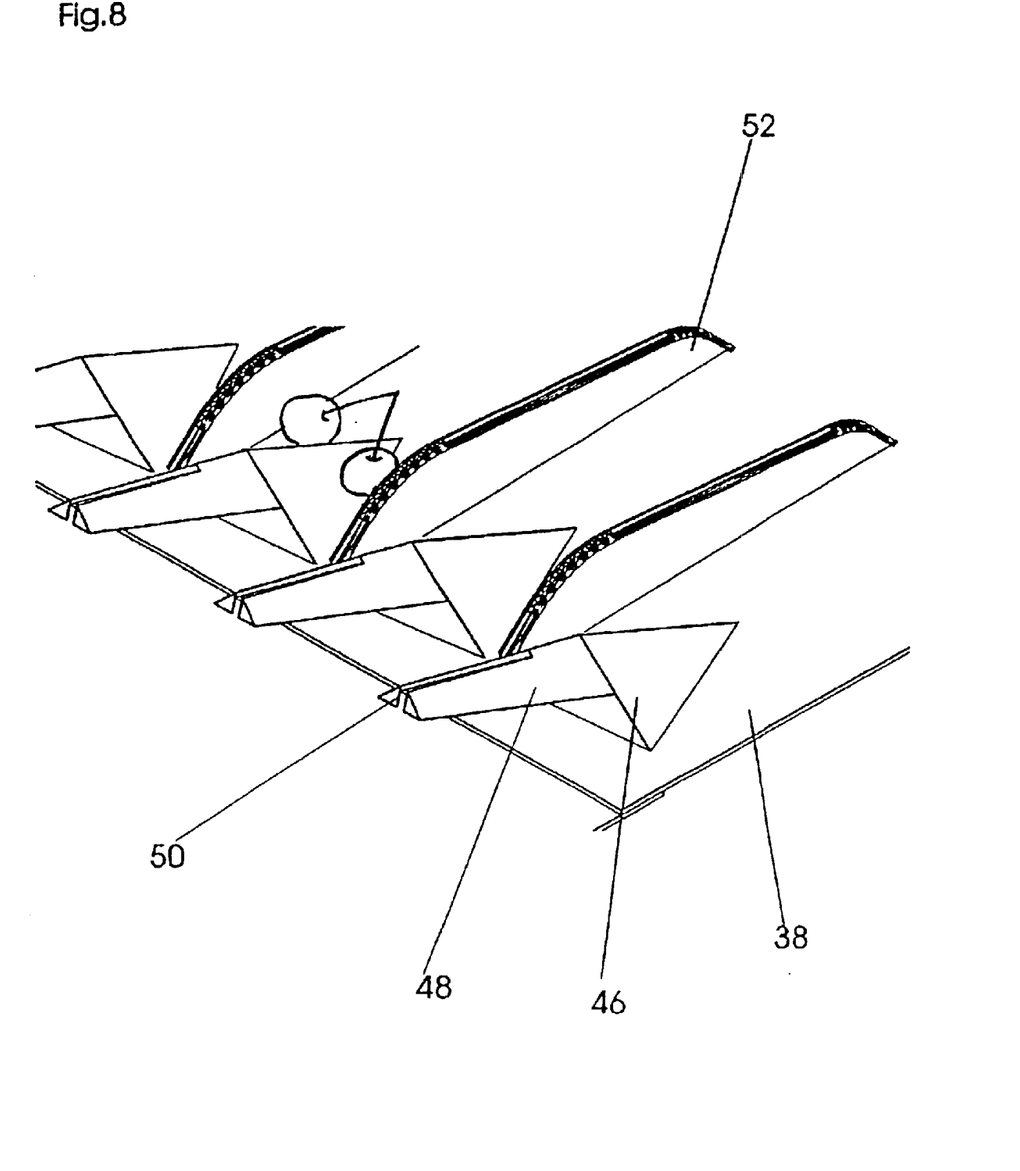
FIG. 8 is an enlarged perspective view of the cutting ramps and guide walls of a cutting module
Figure 9:
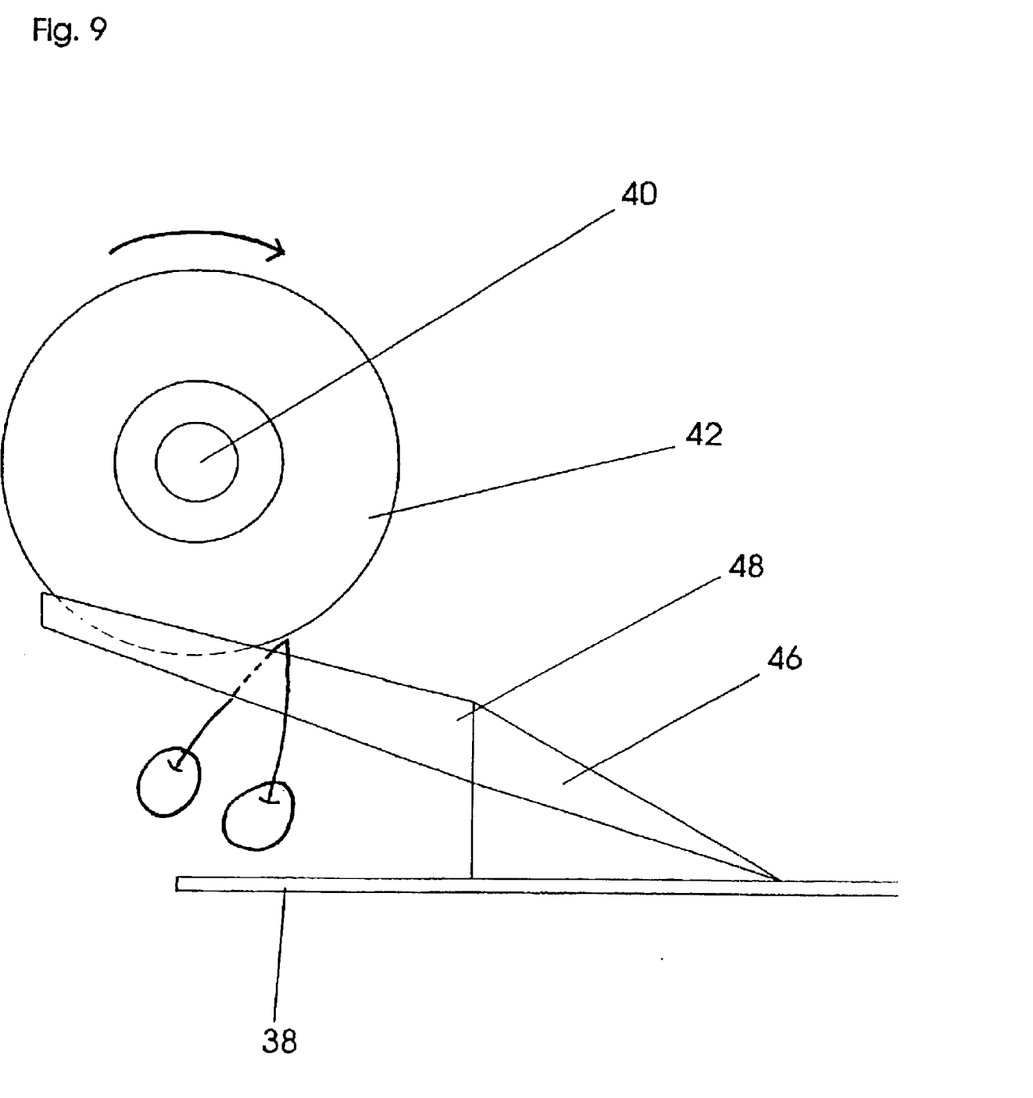
FIG. 9 is a side elevational view of a cutting blade and cutting ramp, with a cluster of cherries in position for cutting

In accordance with the invention there is provided a plurality of cutting modules 36 as depicted in FIG. 7. Each cutting module 36 comprises a generally rectangular base plate 38 having a trailing edge and a leading edge. A rotating shaft 40 having a plurality of circular blades 42 fixed along its length is mounted by bearing housings 44 attached to the sides of base plate 38, such that said circular blades may rotate with approximately 4 cm. clearance between the bottom of the blades and the surface of base plate 38. Attached to the surface of base plate 38, immediately forward of each blade, is a cutting ramp 46 having a generally triangular cross section corresponding generally to the "inverted-V" formed by the stems of a pair of joined cherries. (FIGS. 8,9). The leading end of each ramp begins as a point at the surface of base plate 38, with the triangular cross section gradually increasing as the ridge of the ramp slopes up toward the blade. The trailing end of ramp 46 has an extended tail section 48 projecting immediately underneath its corresponding blade. Tail section 48 contains a groove 50 into which the bottom of the circular blade is recessed, as shown in FIG. 9. Shaft 40 and ramps 46 are mounted near the trailing edge of base plate 38 such that tail sections 48 extend past the trailing edge of base plate 38, as shown in FIGS. 7, 8 and 9. Cutting modules 36 further contain a plurality of vertical guide walls 52, with one guide wall positioned between adjacent cutting ramps in order to form a plurality of channels leading to the ramps, as seen in FIG. 10.

As shown in FIG. 7, each module 36 has a fixed axle 54 welded to the underside of base plate 38 at its leaded edge. Each end of axle 54 passes through a mounting block 56. Mounting block 56 has an opening of predetermined size that permits the free rotation of axle 54. Mounting block 56 is preferably made of plastic or nylon to reduce friction from axle 54, however a ball bearing arrangement could alternately be employed. Cutting modules 36 are mounted perpendicularly across shaker frame 24 as depicted in FIG. 3 by placing mounting blocks 56 on top of two pairs of module support rails 58 attached to the sides of shaker frame 24, as shown in FIGS. 5 and 6. The two module support rails 58 comprising each pair are mounted in close proximity to one another so as to form a channel through which a mounting bolt 60, passing vertically through mounting block 56 (FIG. 7) may be passed. As can be discerned from FIG. 7, when cutting module 36 is so mounted to shaker frame 24, mounting blocks 56 will be fixedly attached to the shaker frame, with the trailing end of base plate 38 free to be raised or lowered by virtue of the rotation of axle 54. The purpose of raising or lowering the trailing ends of base plates 38 will be explained in the subsequent description of the operation of the invention.

Figure 10:
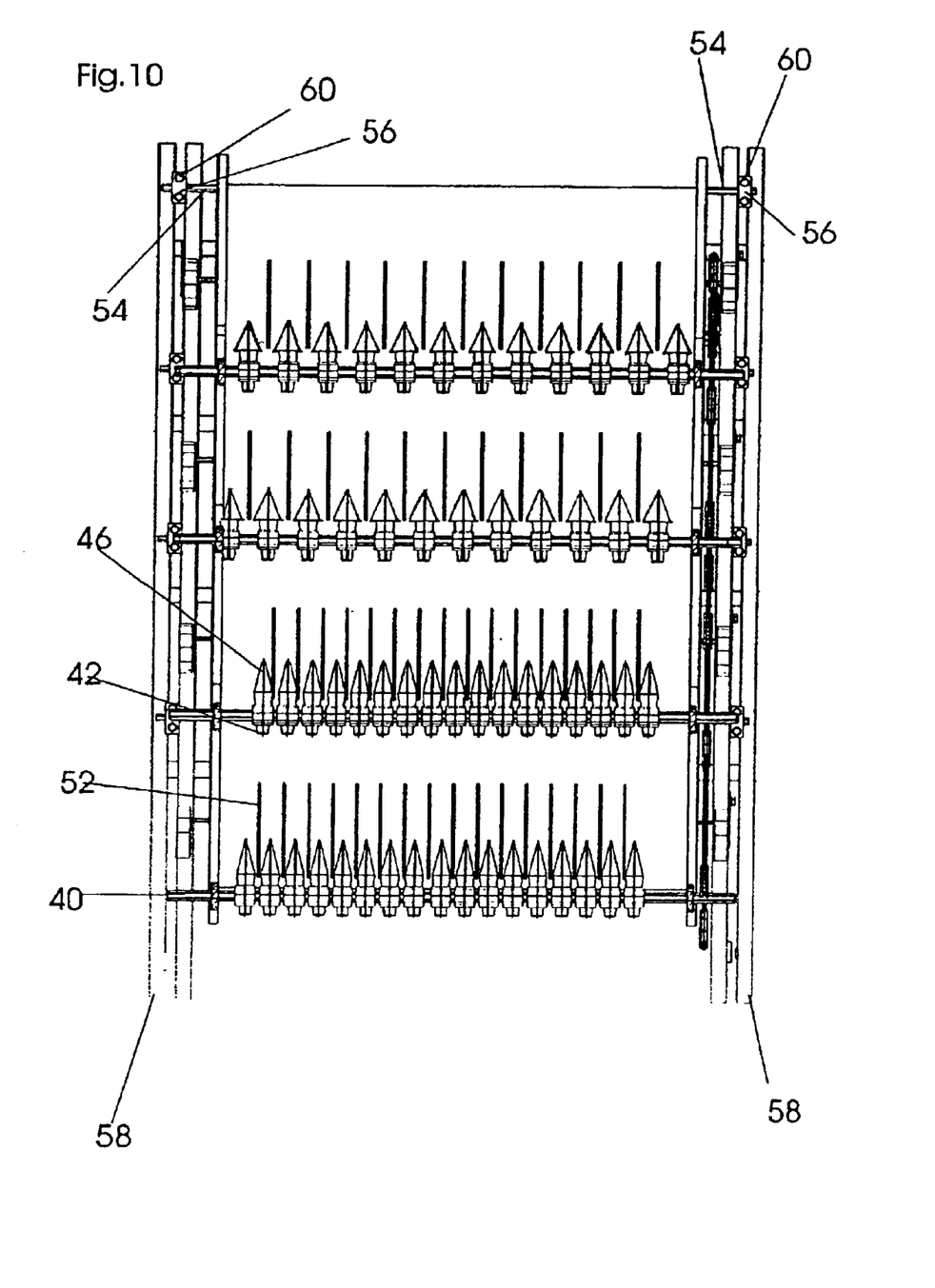
FIG. 10 is a top view of the assembled cutting modules

Referring to FIGS. 3, 8 and 10, it can be seen that modules 36 are mounted to shaker frame 24 such that the trailing edge of base plate 38 from the first module slightly overlaps the leading edge of base plate 38 from the next module and so on, in order to form a continuous surface. When so assembled, tail sections 48 from one module will extend over and above the surface of base plate 38 of the adjacent base plate. The vertical distance between the tail sections of one module and the surface of the adjacent base plate is approximately 4 cm, which is slightly greater than the average length of a cherry stem (See FIG. 9).

Figures 11, 12:
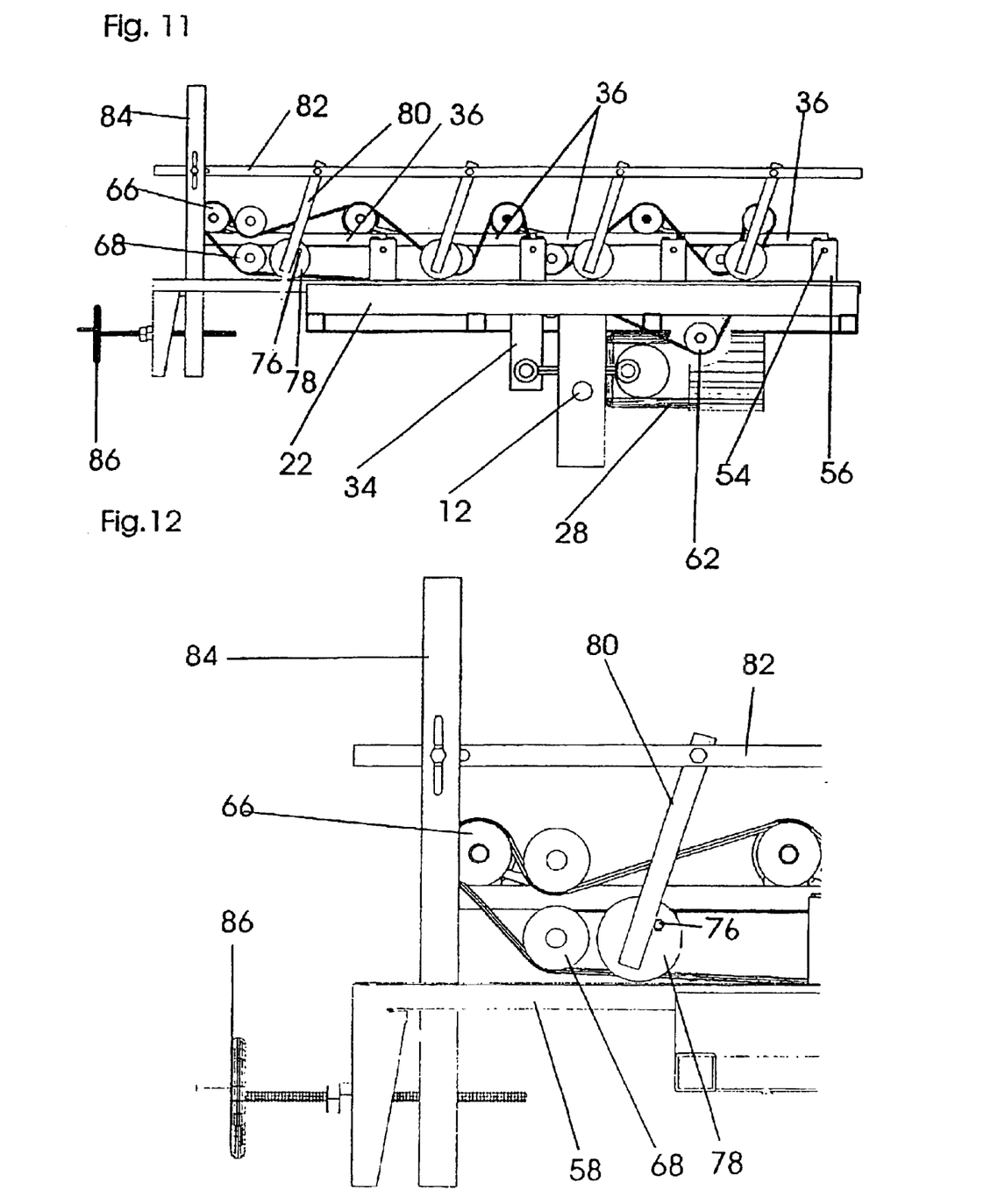
FIG. 11 is a side elevational view showing the endless drive belt arrangement and mechanism for adjusting the attitude of the cutting modules
FIG. 12 is an enlarged side elevational view showing the mechanism for adjusting the attitude of the cutting modules
Figure 13:
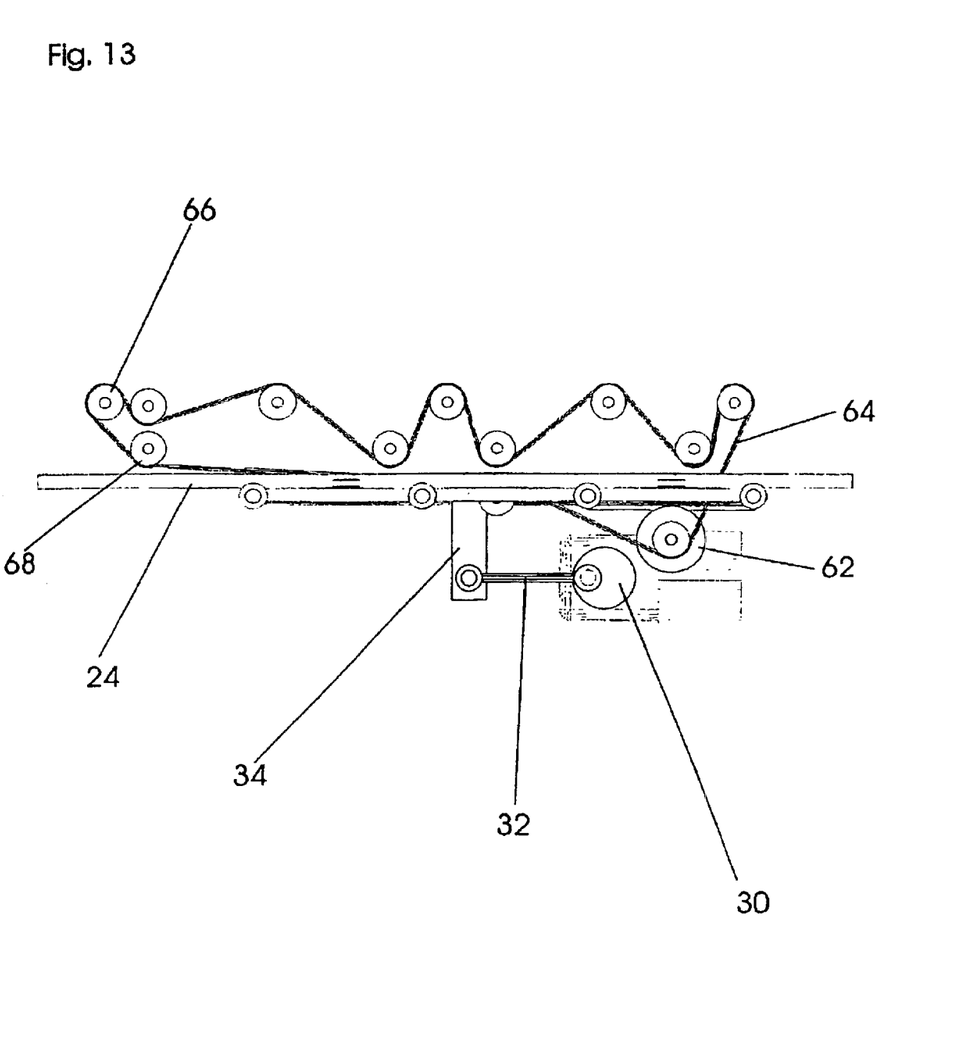
FIG. 13 is a side elevational view showing the endless drive belt arrangement

Shafts 40 of the assembled cutting modules are rotated by means of an electric drive motor 62 mounted to shaker frame 24, as seen in FIGS. 5, 6 and 13. An endless belt 64 is connected between drive motor 62 and a pulley wheel 66 attached to one end of each of shafts 40. A plurality of tensioning wheels 68 as shown in FIGS. 11, 12 and 13 are provided to ensure efficient operation of belt 64.

Description of Operation of the Invention

Figure 14:
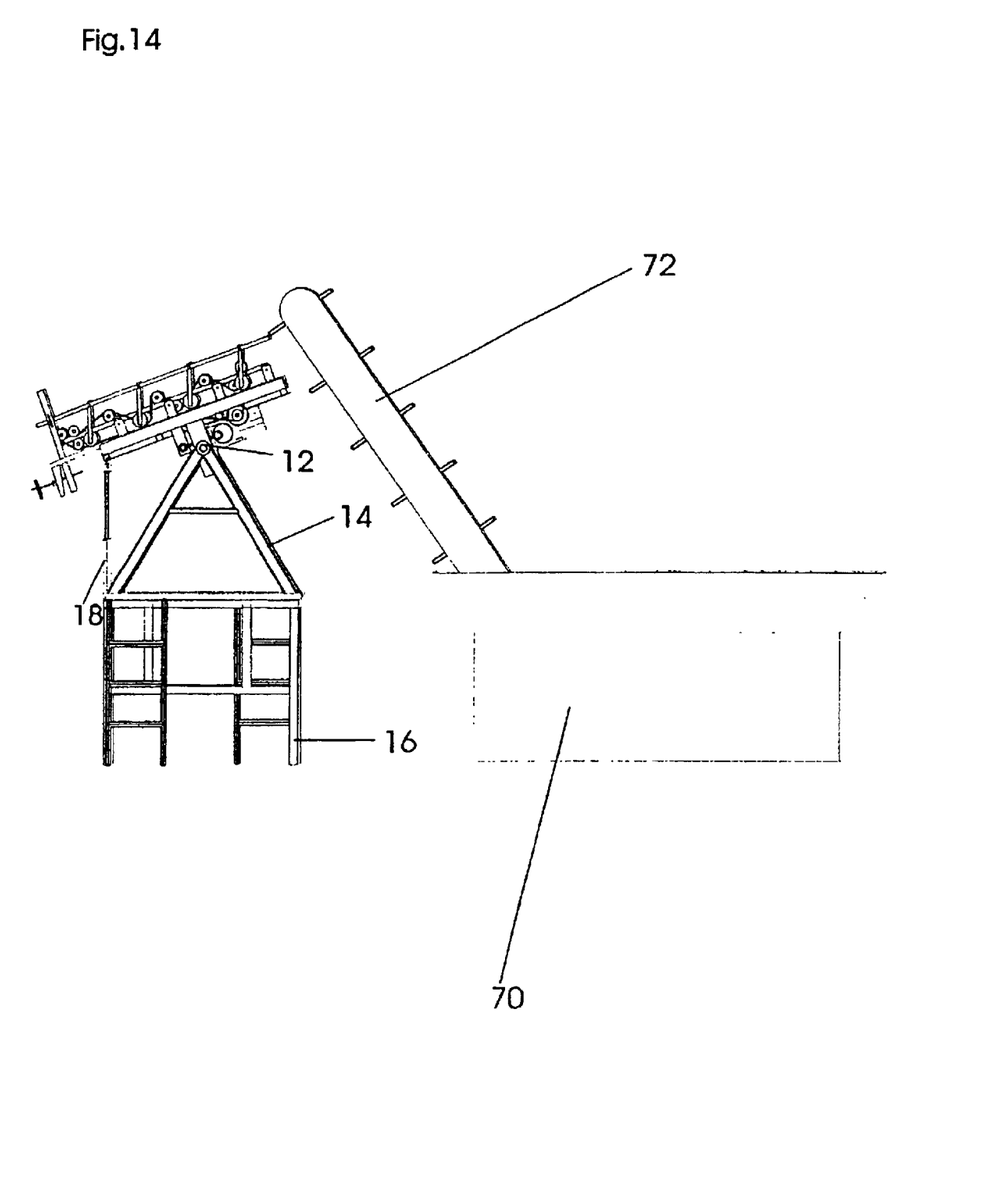
FIG. 14 is a side elevational view of the apparatus, showing a hopper and elevator

FIG. 14 shows the apparatus in its normal operating position. After being picked, clusters of cherries are placed in a hopper 70 containing a water bath. An elevator 72 delivers the cherry clusters, along with a quantity of water, to the leading, upstream end of the apparatus. As can be discerned from FIG. 14, the trailing end of support frame 10 is positioned lower than its leading end by adjustment of hydraulic cylinder 18. (It is to be understood that while adjusting the attitude of support frame 10 is preferably accomplished by hydraulic cylinder 18, other means of adjusting the attitude could equally be employed.) Cherries introduced into the leading end of the apparatus will travel downward toward the trailing end, passing from one cutting module to the next. Experience has shown that an attitude of approximately 22 degrees provides for satisfactory progression of the cherries. Oscillation of shaker frame 24 by motor 28 further assists the cherries to proceed downstream. Referring to FIG. 10, it can be discerned that, after being introduced into the apparatus, a cluster of cherries will enter into a channel formed by two adjacent guide walls 52 and fall downstream until it encounters the cutting ramp 46 disposed therebetween. Due to the predetermined spacing between the guide walls and the ramp, one cherry of the cluster is temporarily caught between the inside surface of guide wall 52 and the side of the ramp (See FIG. 8). The other cherry or cherries of the cluster will seek the path of least resistance and be forced to the opposite side of ramp 46. The oscillation of shaker frame 24 imparts a rotation to the cherries (FIG. 8) which, together with the force from following clusters, causes the "inverted-V" of the stems to ride up the ridge of ramp 46 toward blade 42 (See FIG. 9). Because the distance between tail section 48 and the surface of the next adjacent base plate is greater than the length of the cherry stems, the cherry cluster will dangle from tail section 48 and be cut by the blade at the point of intersection of the stems. The resulting single-stem cherries will then pass freely through the space between the guide walls and ramps of the remaining cutting modules and exit the apparatus at the lower, trailing end.

In order to accommodate varieties of cherries having different stem lengths, means are provided for adjusting the attitude of cutting modules 36, which in turn will alter the vertical distance between tail sections 48 of one module and base plate 38 of the next adjacent module. Such adjustment is necessary in order to ensure that the cherry clusters dangle freely from tail sections 48 at the instant they are cut by the blades. If the distance is too small, and the clusters do not dangle, the stems will not be cut at the point of intersection. Referring to FIGS. 11 and 12, the attitude adjusting means comprises a rigid rod 76 mounted perpendicularly underneath each base plate 38, approximately midway between its leading and trailing edges. Each end of rod 76 is eccentrically attached to a circular cam 78, which rides upon module support rails 58. Attached to each cam 78 is a rigid arm 80, which projects upwardly as shown in FIG. 12. Referring to FIG. 3, it can be seen that arms 80 are all parallel to one another, and are joined by two horizontal connecting bars 82 connected to their upper ends. At the trailing ends of module support rails 58, pivotally attached thereto, are two levers 84 having their upper ends connected to connecting bars 82. An adjustable crank screw 86 connects the lower end of one of the levers 84 with shaker frame 24, as shown in FIGS. 3, 11 and 12. As can be easily discerned by reference to the figures, turning crank screw 86 causes the lower end of lever 84 to be alternately forced forward or back, which, by virtue of connecting bars 82, forces arms 80 in the opposite direction, in unison. The motion of arms 80 causes cams 78 to rotate about rods 76. Because rods 76 are attached eccentrically to cams 78, and because fixed axles 54 (FIG. 7) are free to rotate within mounting blocks 56, the trailing edges of base plates 38 may be selectively raised or lowered in unison, thereby altering the vertical height of tail sections 48.

Referring to FIG. 10, it can be seen that the preferred embodiment of the invention comprises at least four cutting modules. As shown in FIG. 10, the first two cutting modules contain fewer cutting ramps and guide walls, spaced farther apart, than the remaining two cutting modules. The distance between adjacent cutting ramps in the first two modules is approximately 8 cm, while the distance between adjacent cutting ramps in the second two modules is approximately 5.5 cm. The greater spacing of the cutting ramps in the first two modules is necessary to avoid clumping or grouping caused by larger, multi-cherry clusters initially introduced into the apparatus. The first two cutting modules reduce the size of larger clusters, allowing the final two cutting modules to perform the more precise "final cut" resulting in cherries having single stems. As can be further seen in FIG. 10, the cutting ramps and guide walls of one cutting module are in an offset relationship to the cutting ramps and guide walls of the next proceeding cutting module. This arrangement facilitates the cherries exiting one module entering a channel on the next proceeding module, thus reducing clumping or grouping.

A plurality of safety shields may also be provided. A shield may be mounted over each of the rotating shafts 40 to guard the rotating blades, and an elongated shield may be mounted in front of belt 64, pulley wheels 66 and tensioning wheels 68.

What is claimed is:

1. An apparatus for declustering cherries, comprising:
   a plurality of cutting modules, each module comprising a power driven, rotatable shaft having a plurality of circular blades fixed along its length, said shaft being mounted to an elongated, rectangular base plate, said base plate having a leading edge and a trailing edge,
   a plurality of cutting ramps, having a generally triangular cross section, mounted to the surfaces of said base plates, one such cutting ramp being located immediately forward of each circular blade,
   a plurality of vertical guide walls mounted to the surfaces of said base plates, one such guide wall being positioned between adjacent cutting ramps, such that adjacent pairs of said vertical guide walls form a channel leading to the interjacent cutting ramp,
   a generally rectangular support frame comprising a leading end, a trailing end and two side rails, said support frame being pivotally mounted to a base by trunnions,
   a generally rectangular shaker frame adapted to movably rest upon said support frame, said shaker frame comprising a leading end, a trailing end and two sides, between which sides said cutting modules are transversely mounted, in series, such that the trailing edge of the base plate of a preceding module is generally adjacent to the leading edge of the base plate of its adjacent module, thus forming a continuous transport surface, said shaker frame further comprising a plurality of rollers affixed to said sides, said rollers being positioned to engage with said side rails of said support frame, such that said shaker frame is free to roll, in a back and forth fashion, in relation to said support frame,
   means for adjusting the attitude of said support frame such that its trailing, downstream end may be positioned lower than its leading, upstream end, and
   drive means for causing said shaker frame to oscillate back and forth in relation to said support frame,
   such that cherry clusters introduced into the higher, leading end of the apparatus will proceed downstream from one module to the next, the clusters being directed by said vertical guide walls onto said cutting ramps, the triangular shape of which cause the intersection point of the attached stems of the clusters to be presented to said circular blades for cutting.

2. An apparatus for declustering cherries according to claim 1, wherein the triangular cross section of said cutting ramps corresponds generally to the inverted-V shape formed by the stems of adjoined cherries, the leading end of said ramps beginning as a point at the surface of said base plates forward of the blade, with the triangular cross section gradually increasing in size as the ridge of the ramp slopes up toward the blade, said cutting ramps further comprising tail sections projecting horizontally underneath and past said circular blades, said tail sections containing a groove into which the bottom of said circular blades are recessed, said tail sections being elevated above the surface of said base plates at a sufficient height so that clusters of cherries will hang from said tail section by the intersection point of their adjoined stems at the moment of cutting.

3. An apparatus for declustering cherries according to claim 2, wherein said rotatable shafts and cutting ramps are mounted near the trailing edges of their respective base plates, such that the ends of said tail sections extend past the trailing edges of said base plates, said tail sections thus extending over and above the leading edge of the base plate of the next proceeding module.

4. An apparatus for declustering cherries according to claim 3, wherein:

said cutting modules are mounted to said shaker frame by pivotally attaching the leading edge each module's base plate to said shaker frame, such that the trailing edge of each base plate is free to be raised or lowered in relation to the shaker frame, and means are provided for simultaneously raising or lowering the trailing edges of the attached modules, in unison, such that the vertical distance between the projecting tail sections of one module may be adjusted in relation to the pivotally attached leading edge of the next succeeding module, thus allowing the apparatus to be adjusted so that cherry varieties having different stem lengths will hang from said tail sections at the moment of cutting.

5. An apparatus for declustering cherries according to claim 4, wherein one or more of said cutting modules occurring first in the series of modules comprise fewer cutting ramps and guide walls, spaced further apart, than the remaining, down stream modules, thus providing for the splitting of relatively large clusters at the upstream end of the apparatus.

6. An apparatus for declustering cherries according to claim 5, wherein said guide walls of said remaining, down stream modules are positioned at a predetermined distance from their adjacent cutting ramps, such distance being sufficient to cause individual cherries of a cluster to be temporarily caught between the guide wall and the sloping inner surface of the cutting ramp, thus creating a breaking effect which, together with the oscillating motion of the apparatus, causes the remaining cherries of the cluster to rotate to the opposite side of the cutting ramp and proceed, stem node first, toward the circular blades.

7. A method for declustering cherries, comprising the steps of:

introducing a plurality of cherry clusters into an apparatus that has the ability to convey said clusters along a transport surface in an upstream-to-downstream direction, said apparatus comprising one or more rotating circular blades positioned above said transport surface, causing said clusters to encounter one or more cutting ramps, said ramps having a generally horizontal projection extending immediately under said blades, the vertical distance between said projection and the transport surface being greater than the length of the cherry stems, suspending said clusters above the transport surface by causing the clusters to hang from said projection by the node or intersection point of the stems of the cluster, and cutting the cherry stem at the node or intersection.

8. A method for declustering cherries according to claim 7, whereby the transport surface of said apparatus oscillates back and forth in the upstream-downstream direction, and whereby the apparatus is adjusted such that its upstream end is higher than its downstream end, thereby causing the cherry clusters to proceed along the transport surface by the force of gravity and the oscillating motion.

9. A method for declustering cherries according to claim 7 or 8, whereby the vertical distance between said horizontal projections and said transport surface may be adjusted, and further comprising the step of adjusting said vertical distance to accommodate the stem length of the cherry variety to be introduced into the apparatus.

10. A method for declustering cherries according to claim 9, whereby the cherry clusters are introduced into the apparatus by placing the clusters in a hopper containing a water bath, raising the clusters by an elevator, together with a portion of the water from said bath, to the level of the upstream end of said apparatus, and delivering the clusters and water from the elevator into the apparatus.

* * * * *